United States Patent Office 3,439,037
Patented Apr. 15, 1969

3,439,037
METHOD OF PREPARATION OF KETENIMINES
Gopal Hari Singhal, King of Prussia, Pa., assignor to Pennsalt Chemicals Corporation, Philadelphia, Pa., a corporation of Pennsylvania
No Drawing. Filed Mar. 31, 1966, Ser. No. 538,963
Int. Cl. C07c *119/00*
U.S. Cl. 260—566                    6 Claims

ABSTRACT OF THE DISCLOSURE

Ketenimines having the structures

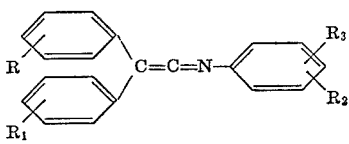

and

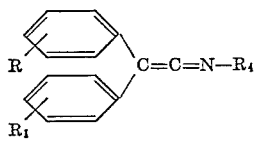

are prepared by reacting copper with a corresponding haloimino halide having the structure

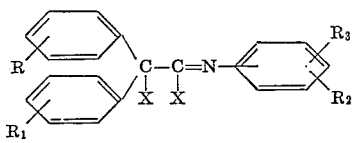

and

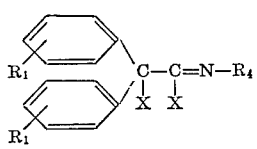

where $R_1$, $R_2$, $R_3$ and $R_4$ are chlorine, nitro, or lower alkyl, $R_4$ is lower alkyl, and X is chlorine, bromine or iodine.

This invention relates to a method for preparing certain ketenimines. More particularly, this invention concerns a process for preparing a ketenimine which comprises reacting copper with an α-haloimino halide.

C. L. Stevens and J. C. French, J. Am. Chem. Soc., 75, 657 (1953) and 76, 4398 (1954), have disclosed the preparation of diphenylketene-p-tolylimine by dehalogenation of the corresponding α-chloroimino chloride using an acetone solution of sodium iodide. There are several disadvantages inherent in the process as therein described: the means required to recover the product from the reaction mixture are quite involved, making the process unsuitable for large-scale commercial preparations. The process of the present invention has several advantages including low cost of the dehalogenating agent and simplicity of operation which renders large-scale preparations feasible.

In accordance with the present invention, it has been discovered that α-haloimino halides can be dehalogenated using copper as the dehalogenating agent. The process may be depicted by the following reaction wherein diphenylketene-p-tolyimine is the product.

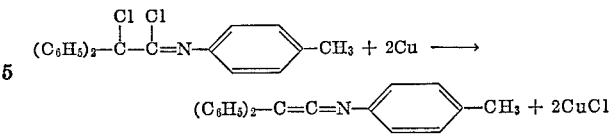

That the foregoing type of reaction takes place in high yield is unexpected in view of the fact that H. Staudinger and J. Meyer, Ber. 53, 72 (1920), reported that zinc metal failed to dehalogenate an α-chloroimino chloride to give a ketenimine.

In general, the process of this invention comprises reacting copper with a compound of the formulae:

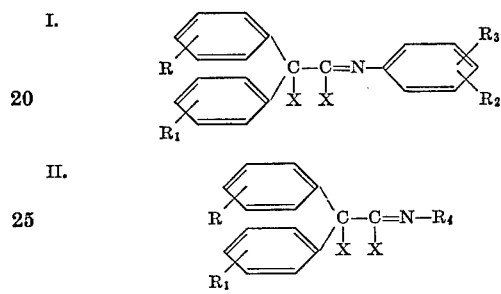

where X is independently chlorine, bromine, or iodine; R, $R_1$, $R_2$ and $R_3$ are independently selected from the group consisting of hydrogen, halogen, (i.e., fluorine, chlorine, bromine and iodine), nitro, alkyl groups having from 1 to 10 carbon atoms and alkoxy groups having from 1 to 10 carbon atoms; and $R_4$ is selected from the group consisting of alkyl groups having from 1 to 10 carbon atoms, alicyclic hydrocarbon groups having 3 to 8 carbon atoms, and 5 and 6 membered heterocyclic organic groups having 4 to 5 ring carbon atoms wherein the sole non-carbon atom of the ring is nitrogen or sulfur, e.g., pyrrolyl, pyrrolidinyl, pyridinyl, piperidinyl, thiophenyl, thiophanyl and the like.

In accordance with said reaction, the foregoing α-haloimino halides are dehalogenated to produce the corresponding ketenimines having the formulae:

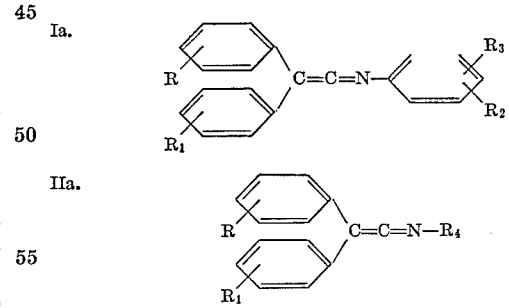

where R, $R_1$, $R_2$, $R_3$ and $R_4$ are as defined above. Representative and preferred halides which are dehalogenated by reaction with copper according to this invention are the following:

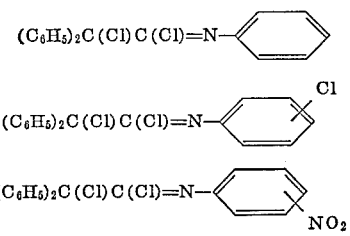

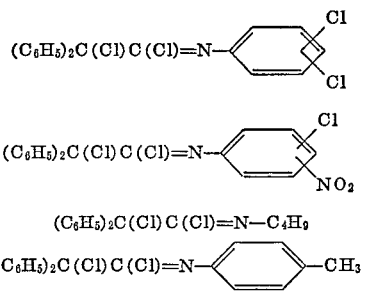

$(C_6H_5)_2C(Cl)C(Cl)=N-\langle\text{Cl, Cl phenyl}\rangle$ $(C_6H_5)_2C(Cl)C(Cl)=N-\langle\text{Cl, NO}_2\text{ phenyl}\rangle$ $(C_6H_5)_2C(Cl)C(Cl)=N-C_4H_9$ $(C_6H_5)_2C(Cl)C(Cl)=N-\langle\text{phenyl}\rangle-CH_3$ The ratio of reactants in the practice of this invention is not critical and may range from about 2 moles to about 10 moles of copper per mole of haloimino halide, with a molar ratio within the range of about 3:1 to 5:1 being preferred. The reaction temperature can vary from about 20° to about 150° C., preferably within the range of about 60° to 85° C. To insure good contact between the reactants it is advantageous to use copper in a finely divided form, and it is of course desirable to stir the reaction mixture to facilitate intimate contact. The period of reaction may be from about 30 minutes to 24 hours; however, good yields are generally obtained in about 3 to 5 hours. It is convenient and advantageous, although not necessary, to carry out the dehalogenation in an inert organic solvent. Suitable solvents include aromatic hydrocarbons such as benzene, toluene, xylene, and the like; oxygenated alaphatic hydrocarbons such as the ethers, for example, diethyl ether, dioxane and tetrahydrofuran, and ketones such as methyl ethyl ketone and cyclohexanone and the like; alkanes such as petroleum ether, hexane, heptane, octane; and halogenated hydrocarbons such as carbon tetrachloride.

The insoluble, unreacted copper and by-product copper halide salt are easily separated from the reaction mixture by filtration or centrifugation. If an inert organic solvent has been used in the dehalogenation, the product ketenimine is recovered by merely evaporating the solvent using conventional distillation techniques. The product may then be purified, if desired, by vacuum distillation or by crystallization from such solvents as petroleum ether, hexane, and a mixture of solvents such as benzene-hexane, benzene-petroleum ether, ether-petroleum ether and ether-hexane, following an optional treatment with activated carbon to remove trace residual impurities.

The examples which follow are set forth to illustrate and clarify the invention as described herein and should not be construed to limit the scope thereof. The amounts of materials in said examples are given in parts by weight.

EXAMPLE 1

Into a reaction vessel equipped with a stirring device and a reflux condenser are charged 10 parts of N-(p-nitrophenyl)-2-chloro-2,2-diphenylacetimidoyl chloride, 11 parts of copper powder and 220 parts of benzene. The mixture is refluxed for 5 hours at about 80° C., cooled to room temperature and filtered to remove unreacted copper and by-product copper chloride. The benzene is distilled from the filtrate under reduced pressure to leave a residual oil which is crystallized from a mixture of diethyl ether and hexane to yield 6.5 parts of N-(2,2 - diphenylvinylidene)-p-nitroaniline which has the form of red crystals having a melting point of 85–87° C. The conversion of the starting α-chloroimino chloride to said product is 81%.

EXAMPLE 2

The reaction of the preceding example is repeated using a mixture of 35 parts of N-(p-nitrophenyl)-2-chloro-2,2-diphenylacetimidoyl chloride, 31 parts of copper powder and 396 parts of benzene. 26.1 parts of N-(2,2-diphenylvinylidene)-p-nitroaniline product (91.4% conversion) is recovered by the method of Example 1 except that a di-ethyl ether-petroleum ether mixture is employed for the crystallization.

EXAMPLE 3

A stirred mixture of 29 parts of N-(p-chlorophenyl)-2-chloro-2,2-diphenylacetimidoyl chloride, 30 parts of copper powder and 396 parts of benzene is refluxed for 5 hours, cooled, and filtered to remove copper chloride and unreacted copper. Benzene is distilled from the filtrate under vacuum, the residual oil is dissolved in 195 parts of petroleum ether, the solution treated with "Darco" activated carbon and filtered. The petroleum ether is stripped from the filtrate under reduced pressure to yield 24.2 parts (86.4% conversion) of bright yellow crystals of N - (2,2 - diphenylvinylidene)-p-chloroaniline, M.P. 69.5–71.0° C. Elemental analysis gives: C, 78.80; H, 4.82; N, 4.92. Calculated for formula $C_{20}H_{14}ClN$: C, 79.09; H, 4.61; N, 4.61.

EXAMPLE 4

A stirred mixture of 21.1 parts of N-p-tolyl-2-chloro-2,2-di-p-chlorophenyl acetimidoyl chloride, 15 parts of copper powder and 220 parts of anhydrous benzene is refluxed for 3 hours, cooled and filtered. The benzene of the filtrate is removed under reduced pressure and the residual oil is dissolved in petroleum ether, the solution treated with "Darco" activated carbon, and filtered. The petroleum ether is stripped from the filtrate to yield 10.1 parts (57.4% conversion) of yellow crystals of N-(2,2-di-p - chlorophenylvinylidene)-p-toluidine, M.P. 82–84° C. Elemental analysis gives: C, 71.22; H, 4.56; N, 4.19. Calculated for formula $C_{21}H_{15}Cl_2N$: C, 71.6; H, 4.26; N, 3.98.

EXAMPLE 5

A stirred mixture of 32 parts of N-butyl-2-chloro-2,2-diphenylacetimidoyl chloride, 25 parts of copper powder and 250 parts of anhydrous benzene is refluxed for 6 hours and filtered. Benzene is removed from the filtrate under reduced pressure and the residual oil is fractionated to give 11.8 parts (47.3% conversion) of yellow oil which is N-(2,2-diphenylvinylidene)-butylamine, B.P., 0.1 mm. Hg, 128–135° C., $n_D^{25}$ 1.6030 [C. L. Stevens and J. C. French, J. Am. Chem. Soc., 76, 4398 (1954), report B.P., 0.15 mm. Hg, 154–158° C., $n_D^{25}$ 1.6026, 1.6006].

EXAMPLE 6

A stirred mixture of 42 parts of N-(4-chloro-3-nitrophenyl) - 2 - chloro-2,2-diphenylacetimidoyl chloride, 35 parts of copper powder and 450 parts of anhydrous toluene is refluxed for 3 hours, cooled and filtered. Toluene is removed from the filtrate under reduced pressure and the residue is crystallized from petroleum ether to give 29.6 parts (84.5% conversion) of bright yellow crystals of N - (2,2-diphenylvinylidene)-4-chloro-3-nitroaniline, M.P. 72–73° C. Elemental analysis gives: C, 68.66; H, 4.06; N, 8.08. Calculated for formula: $C_{20}H_{13}ClN_2O_2$: C, 68.86; H, 3.73; N, 8.03.

The compounds produced according to the method of this invention are useful in the field of agricultural chemicals because of their insecticidal and miticidal activity.

I claim:

1. A method for preparing a ketenimine having the formula selected from the group consisting of

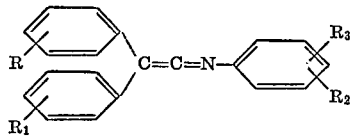

and

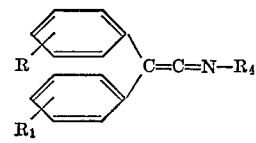

where R, $R_1$, $R_2$ and $R_3$ are independently selected from the group consisting of chlorine, nitro and lower alkyl and $R_4$ is lower alkyl which comprises reacting from about 2 to about 10 moles of copper at a temperature within the range of about 20° C. to about 150° C., with one mole of a corresponding haloimino halide selected from the group consisting of

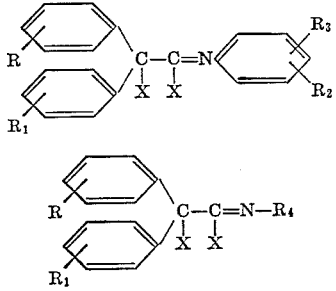

where R, $R_1$, $R_2$, $R_3$ and $R_4$ are as defined above and X is independently selected from the group consisting of chlorine, bromine and iodine.

2. The method of claim 1 wherein the haloimino halide is N-(p-nitrophenyl)-2-chloro-2,2-diphenylacetimidoyl chloride.

3. The method of claim 1 wherein the haloimino halide is N-(p-chlorophenyl) - 2 - chloro-2,2-diphenylacetimidoyl chloride.

4. The method of claim 1 wherein the haloimino halide is N-p-tolyl-2-chloro-2,2-di-p-chlorophenylacetimidoyl chloride.

5. The method of claim 1 wherein the haloimino halide is N-butyl-2-chloro-2,2-diphenylacetamidoyl chloride.

6. The method of claim 1 wherein the haloimino halide is N-(4-chloro-3-nitrophenyl) - 2 - chloro-2,2-diphenylacetimidoyl chloride.

References Cited
UNITED STATES PATENTS 2,504,919  4/1950  Bordner _____ 260—677 X LEON ZITVE, *Primary Examiner.*

L. C. MARUZO, *Assistant Examiner.*

U.S. Cl. X.R.

424—356